United States Patent [19]

Gyi et al.

[11] Patent Number: 4,509,251
[45] Date of Patent: Apr. 9, 1985

[54] APPARATUS AND METHOD FOR ORIENTING A MAGNETIC GAP IN A SLIDER HEAD IN A CARRIAGE

[75] Inventors: Ko K. Gyi, Thousand Oaks; Gurbachan S. Grewal, Sepulveda, both of Calif.

[73] Assignee: Magnetic Information Technology, Inc., Chatsworth, Calif.

[21] Appl. No.: 426,883

[22] Filed: Sep. 29, 1982

[51] Int. Cl.³ .............................................. G11B 5/42
[52] U.S. Cl. .................................... 29/603; 29/281.5; 29/467; 29/721; 29/760; 156/64; 156/378; 156/379; 156/556
[58] Field of Search ................. 29/603, 467, 721, 760, 29/281.5; 156/64, 378, 379, 556, 293, 303.1

[56] References Cited

U.S. PATENT DOCUMENTS 3,872,566 3/1975 Pedrotti ............................ 29/721 X
4,391,035 7/1983 Van de Bult ........................ 29/603

Primary Examiner—Carl E. Hall
Attorney, Agent, or Firm—Evanns & Walsh

[57] ABSTRACT

Fixture means and method for accurately positioning a carrier member or button with a magnetic slider head having a gap, in a carriage to be mounted in magnetic information storage equipment, particularly adapted for use with micro and mini computers. The fixture embodies a pair of parallel rods on which the carriage can be mounted for relative sliding movement. The fixture has a transparent panel at one end. The carriage is positionable in the fixture with the carrier button and the magnetic slider head directly underneath the transparent panel. A plunger and spring is provided in the fixture to provide a holding force against the magnetic slider head against the underside of the transparent panel. A video camera is provided having a lens with a reticle in it positioned with the optical axis aligned to provide an image of the magnetic gap. The camera is connected in closed circuit relationship with a television set or projector so that an image of the magnetic gap and the reticle appear on the display screen magnified 20 times. The operator then manually adjusts the button and the magnetic gap to orient the gap with reference to the image of the reticle in azimuth, track to track relationship and in indexed relationship.

16 Claims, 6 Drawing Figures

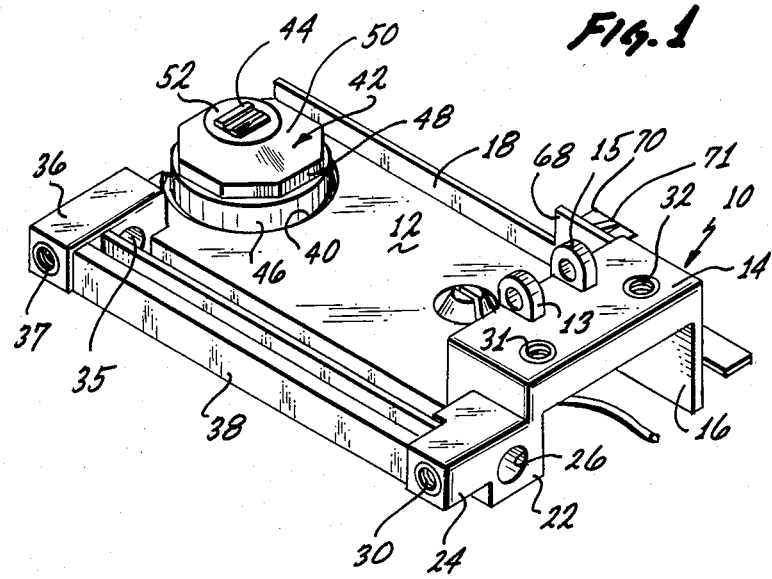
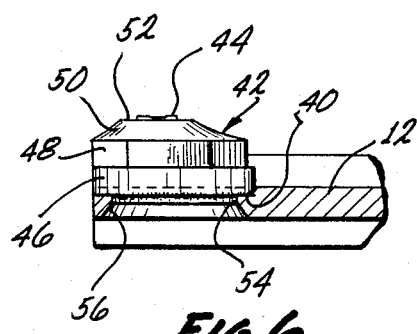
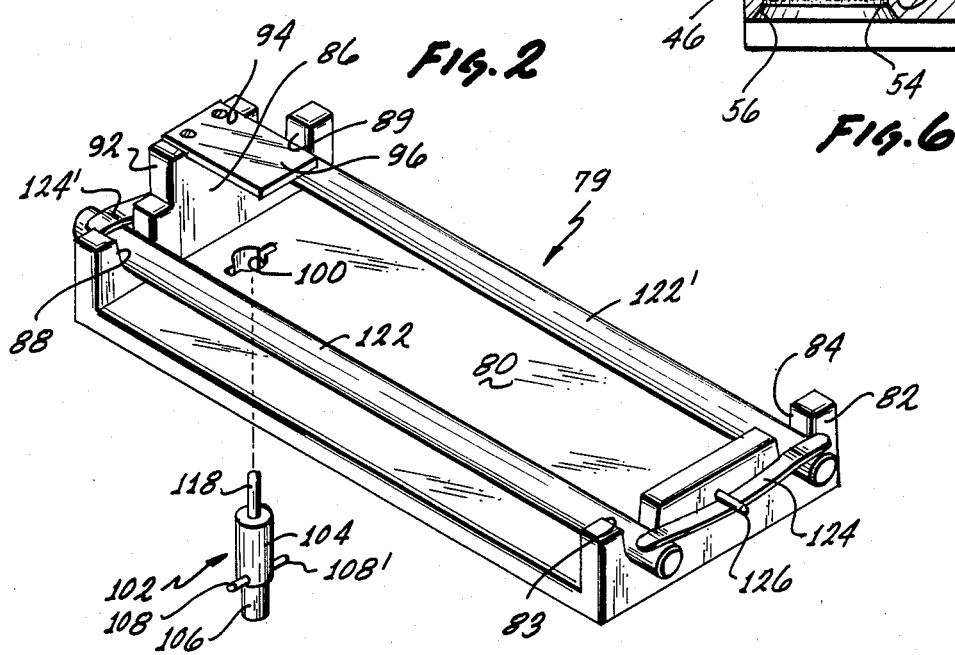

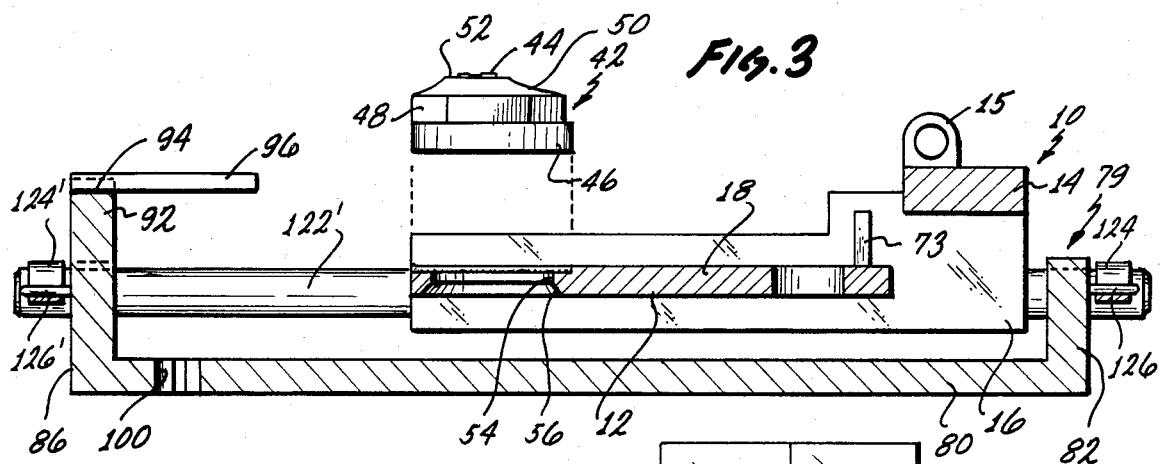
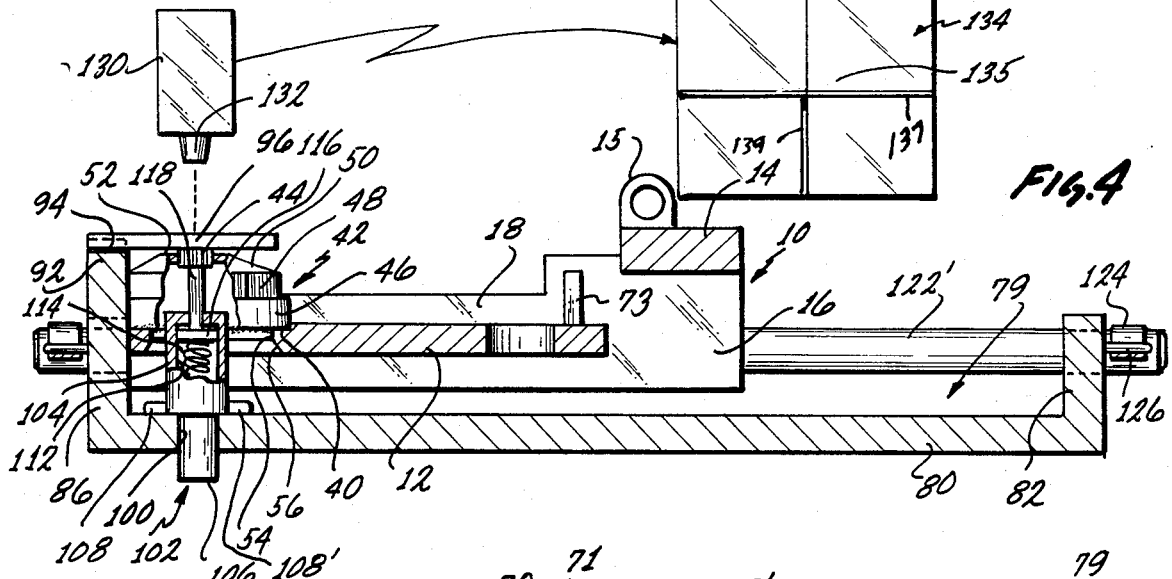
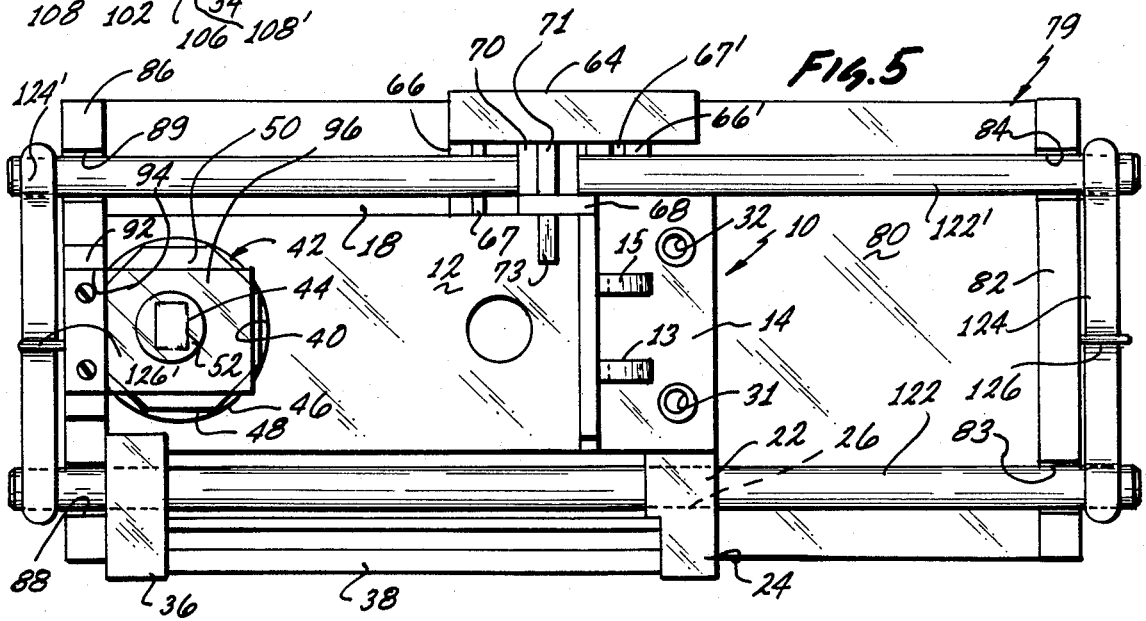

APPARATUS AND METHOD FOR ORIENTING A MAGNETIC GAP IN A SLIDER HEAD IN A CARRIAGE

BACKGROUND OF THE INVENTION

1. Field of the Invention

The field of the invention is that of magnetic information storage equipment more particularly of the type used in micro and mini computers. The invention is particularly concerned with the movable carried utilized in this type of equipment which carries a button that has mounted in it a magnetic slider head having a magnetic gap.

2. Description of the Prior Art

U.S. Pat. Nos. 4,139,876 and 4,170,146 relate to equipment of the type in which information is magnetically stored on a flexible disc. This type of equipment embodies a movable carriage which supports or carries a button which in turn carries a magnetic slider head having a magnetic gap which contacts the record on which the information is magnetically stored.

Equipments or apparatuses of the type shown in the said patents is primarily utilized in mini computers and micro computers.

The carriage which carries the button and the magnetic gap may be manufactured or fabricated as a separate component or subcomponent and marketed as such for assembly with other apparatus by a vendor.

The movable carriage, as stated, is assembled in the apparatus which includes the drive for the flexible record. In this apparatus the carriage with the button and magnetic gap are moved with precision relative to the tracks in the record which carry the stored magnetic information. The button carrying the magnetic slider head and the magnetic gap has to be accurately oriented in position with reference to the carriage which moves it with respect to the disc record. The prior art has lacked tooling or related apparatus and methods or techniques for assembling the button and the magnetic slider head in or with respect to the carriage in oriented position. The difficulty stems from the fact that the magnetic gap and the magnetic slider head has to be oriented in terms of azimuth, track to track relationship, and with respect to indexing. The prior art is lacking in technology for accomplishing the precision assembly of the button and the magnetic gap in the carriage.

The herein invention, an exemplary form of which is described in detail, has been evolved in order to meet these unfilled needs of the prior art.

SUMMARY OF THE INVENTION

The carriage in which the carrier or button in which the magnetic slider head is mounted may be typical of items of this type presently in use. In the magnetic storage apparatus, the carriage is mounted to be moved linearly and typically it is moved by a stepper motor so that the magnetic slider head is moved along a radius of a disc record which typically is of a flexible type. The movement of the carriage moves the magnetic gap in the magnetic slider head from track to track or the record disc.

The magnetic gap in the magnetic slider head has to be oriented with precision for azimuth, that is, relative angle; track to track relationship and indexing, that is, movement along the radius.

The invention provides tooling, more particularly a fixture for holding the carriage for relative movement simulating its mounting in the apparatus in which it is to be used. In a preferred form the fixture embodies a pair of parallel rods on which the carriage can be mounted, the rods being removable for purposes of mounting the carriage.

The fixture includes a transparent plate member mounted so that the magnetic gap in the magnetic slider head can be positioned directly under it. Also, it includes a spring plunger unit for applying holding force to the magnatic slider head to hold it in position in the fixture.

A camera is provided having a lens with a reticle, that is, crossed hairs which provide a reference point. This point is accurately positioned or referenced with respect to the fixture and the carriage mounted on the fixture. The camera is mounted so that an image can be produced of the reticle and the magnetic gap in the magnetic slider head which is positioned underneath the transparent panel.

The camera has coupled to it a closed circuit television set or projector with display screen and an image of the reticle and the magentic gap, amplified, for example, 20 times is displayed or projected on the screen.

The method of fabrication or assembly involves the steps of forming the fixture; mounting the carriage on the fixture with the button and magnetic slider head positioned in the carriage; applying bonding material; positioning the carriage with the button and the magnetic gap of the magnetic slider head underneath the transparent panel; then forming the magnified image by the camera and projector of the reference point and the magnetic gap on the television screen, the operator then preforming the steps of orienting the magnetic gap relative to the cross hairs displayed on the television screen while viewing the screen so that accurate orientation is realized. The material which bonds the button to the carriage is then allowed to set completing the assembly or fabrication of the component or subcomponent.

A primary object of the invention is to make available the method as recited above and to provide tooling appropriate to execution of the method.

Another object of the invention is to realize apparatus in the form of tooling which facilitates or makes possible the accurate mounting and orientation of a magnetic gap in a carrier button in a carriage which will movably carry the button.

A further object is to provide apparatus in the form of tooling which includes a fixture for movably holding the carriage with means for establishing a fixed reference point relative to the fixture carriage, with a camera and display means for displaying a magnified image of the reference point and the magnetic gap whereby an operator can orient the position of the button so as to orient the magnetic gap while observing the display on the screen.

A further object is to provide apparatus including a fixture as in the foregoing constructed for movably carrying the carriage; the fixture having a transparent plate positioned so that the button and magnetic slider head can be moved underneath it, a camera with a lens with a reticle having a fixed position relative to the fixture and carriage along with projection means including a display screen on which an image of the reticle and magnetic gap can be displayed.

Further objects and additional advantages of the invention will become apparent from the following detailed description and annexed drawings.

BRIEF DESCRIPTION OF THE DRAWINGS

FIG. 1 is an isometric view of a carriage for a magnetic head used in a record drive assembly, or magnetic data storage equipment;

FIG. 2 is an isometric view of a fixture in which the carriage of FIG. 1 can be held;

FIG. 3 is a longitudinal sectional view of the fixture of FIG. 2 with the carriage of FIG. 1 held in it in one position;

FIG. 4 is a view similar to that of FIG. 3 taken along the line 4—4 of FIG. 3, with the carriage in a position in which the button carrying the magnetic slider head is adjusted in position, the figure illustrating diagrammatically the viewing camera and display screen;

FIG. 5 is a plan view of the fixture and carriage as shown in FIG. 4.

DESCRIPTION OF A PREFERRED EMBODIMENT AND BEST MODE OF PRACTICE

FIG. 1 is an illustration of a typical movable carriage carrying a magnetic head as appears in data storage equipment using disc records and disc record drive. The carriage is designated as a whole by the numeral 10. It may be constructed of plastic or other suitable material. It has a base or bottom 12. At one end it has raised upstanding part or platform 14 which has a depending side 16 which includes a side part 18 extending along the side of the base 12.

The platform 14 has on its top a pair of apertured lugs 13 and 15 which are for the purpose of mounting an arm carrying a second magnetic head.

At the other side of the platform 14 is a depending part 22 having a laterally extending portion 24. The depending part 22 has an aperture 26 extending through it for a purpose which will be described presently. Numeral 30 designates an internally threaded insert for receiving a screw. This insert is for purposes of attachment of a driving mechanism for the carriage. Platform 14 also has threaded inserts in it as designated at 31 and 32 for attachment of parts.

At other end of the base 12 there is a block formation as designated at 36 having in it a threaded insert 37 like the insert 30. Extending between the parts 24 and 36 is a longitudinal frame member 38 having a top groove in it which is spaced from the side of the base 12.

In the end of the base 12 is a circular aperture 40 which receives the carrier member or button 42 which carries the magnetic slider head 44 which contacts the flexible record disc on which information is magnetically recorded, that is, stored. The slider has a core bonded into it having a magnetic gap. The gap is crosswise of the core. The gap has by way of example a width of 80 micro inches. The core may have a length of 0.016 inches and a width of 0.008 inches.

The button 42 is round having a lower cylindrical part 46 and an upper octagonal part 48. The top of the button is tapered as shown at 50 the taper extending to a flat top 52 with the magnetic slider head positioned in an opening in the top 52.

As may be seen in the cross sectional view of FIG. 3 the aperture 40 is a counter bore at the upper end of a bore 54 this bore having a tapered counter bore 56 in the base 12 as shown.

The part 36 has in it an aperture 35 which is like the aperture 26.

Referring to FIG. 5, the structure at the right hand side of the carriage 10 may be observed. This structure includes a flat platform 64, which is supported at the side of the carriage 10 by way of support members 66 and 66'. The top of these members is these members is rounded with flatening as designated by the numerals 67 and 67'. Extending from a raised end part 68 of the side 18 of the carriage 10 is a guide member 70 having a top rib 71 and a lower surface of which has a configuration like the surfaces 66 and 66'. The members 66, 66', and 70 form a guide way between them for a guide rod that is part of the fixture, as will be described. Numeral 73 designates a strengthening rib.

FIG. 2 is an isometric view of the fixture of the invention which is constructed for holding or mounting the carriage of FIG. 1.

FIG. 2 is an illustration of the fixture 79 in which the carriage is held or mounted while the carrier member or button 42 is set in an accurately oriented position. The fixture 79 has a base 80 having an end member 82 at one end having in it notches 83 and 84. At the other end of the base 80 is an end member 86 having in it corresponding notches 88 and 89. The end member 86 has an intermediate upstanding portion 92 having a recess in it as designated at 94 which receives a transparent member 96 which is secured in the recess 94 by screws as shown. The transparent member 96 overlies an opening 100 in the base which has a shape as shown in FIG. 2, which includes a circular part with diametrically opposed side extensions.

Numeral 102 designates a spring plunger unit which is shown more in detail in FIG. 4. It has a cylindrical body part 104 and a lower part 106 of smaller diameter. The part 104 has radially extending fingers 108 and 108' which can be extended through the side extensions of the opening 100 and then they can be positioned to rest on the bottom 80 of the fixutre as can be seen in FIG. 4.

The cylindrical part 104 has a bore 112 within which is a coil spring 114 which bears against disc or piston member 116 carrying a stem 118 which extends through an aperture in the end of the cylinder 104. The purpose of the unit 102 will be described more in detail presently.

Numerals 122 and 122' in FIG. 2 designate a pair of rods which are in a parallel relationship, the ends of the rod 122 being in the notches 83 and 88 and the ends of the rod 122' being in the notches 84 and 89. Numeral 124 designates a leaf spring the ends of which overlie the ends of the rods 122 and 122' and the intermediate part of which is underneath a pin 126 extending from the end 82. The spring 124 is held bowed, its tension holding the ends of the rods 122 and 122' in position. A similar spring 124' is provided at the other end 86 held in a similar manner, this spring holding the opposite ends of the rods 122 and 122'.

FIGS. 3, 4, and 5 illustrate the carriage 10 mounted on or in the fixture 79. As may be seen the rod 122 is extended through the apertures 26 and 35 in the ends parts of the carriage. The rod 122' extends between the guide members 66—66' and 70, as may be seen in FIG. 5. The carriage 10 can be slid along the rods 122 and 122' in the same manner as it is moved typically in response to a stepper motor when mounted in a disc drive unit such as, for example, as shown in U.S. Pat. No. 4,139,876 and U.S. Pat. No. 4,170,146.

FIG. 3 shows the carriage 10 in a position in the fixture wherein the button 42 can be placed in the counter bore 40 of bore 54.

FIGS. 4 and 5 show the carriage 10 moved forwardly into position wherein the button 42 is directly underneath the transparent member 96.

As may be seen in the position of FIG. 4, the magnetic slider head carried by the button 42 is directly underneath the transparent member 86 and bearing against it. The spring plunger 102 is in position as may be seen in FIG. 4, with the stem 118 against the lower side of the magnetic slider head 44 urging it against the other side of the transparent member 96.

Numeral 130 designates a video camera having a lens 132 which is mounted in a fixed position directly over the transparent member 26 so that the magnetic gap in the magnetic slider head 44 is aligned with the optical line of sight of the camera 130.

Numeral 134 designates a closed circuit television set having a display screen 135, the television set being interconnected with the camera 130.

The lens 132 of the camera has formed in it a reticle, that is, cross hairs establishing a reference point. The camera 130 and the reference point in the lens 132 are positioned with precision relative to the fixture 79 and to the carriage 10, that is, there is a precision relationship between the reference point and these parts. The camera is mounted in an assembly station (not shown) which receives the fixture 79 and carriage 10 in a predetermined position so that there is a predetermined precision relationship between the reference point and the fixture and carriage.

THE METHOD

With respect to the practice of the method the following is to be observed. Firstly, the fixture as shown in FIGS. 2–5 is provided or constructed so that the carriage can be mounted on it in the same manner that the carriage is movably mounted in the apparatus of which the carriage is a component.

The carriage 10 is positioned in the fixture as shown in FIG. 3. The button 42 is positioned with its bottom part set loosely in the counter bore 40. Epoxy bonding material is applied to base 46. The carriage 10 is then slid on the rods 122 and 122′ into a position as illustrated in FIGS. 4 and 5 in which the button 42 and the magnetic slider head are directly underneath the transparent panel 96 as previously described.

With the parts as shown, the camera is operated so that an image of the gap in the magnetic slider head and the reticle in lens 132 is transmitted to the television set or projector 134 and displayed on the screen 135. As may be observed in FIG. 4, the edge of the core appearing at line 137 and the magnetic gap provides a straight line 139 at right angles to it form a T. The image which appears on the television screen is magnified 20 times, for example. The operator is able to adjust or manipulate the position of the button 42 while looking at the enlarged image on the display screen of the gap in the magnetic slider head in relation to the reticle that is the cross hairs. The operator can then manually position the head 42 so that the T of the gap is aligned with the cross hairs at the reference point. When the adjustment is made the gap is oriented in azimuth, for track to track relationship, and is indexed, that is, relative to movement along a radius of the disc record. That is, since the intersection of the cross hairs in the lens is accurately referenced in position relative to the fixture 79 and the carriage 10, the gap in the magnetic slider head being accurately positioned relative to the cross hairs in the lens the button 42 and the gap have been accurately positioned in reference to the carriage 10. The carriage 10 can now be assembled in the record drive equipment or information storage equipment and can be accurately operated by a stepping operation to position the magnetic slider head and magnetic gap relative to the record.

In operation the gap is moved along a radius of the disc record. Orientation in azimuth is accomplished by positioning the gap with respect to the vertical line of the reticle. Positioning of the gap relative to the horizontal hair line orients it for correct track to track movement and also for indexing movement.

When the operator has positioned the button 42 in the counter bore 44 in a position wherein the gap in the magnetic slider head is oriented with respect to the cross hairs in the lens 132, the operator then permits the bonding material such as epoxy around the bottom edges of the button 42 to cure. The carriage 10 remains in the fixture while the epoxy is allowed to cure securing the head in the reference position.

From the foregoing those skilled in the art will readily understand the nature of the construction of the invention, the method and the manner in which the objects and results as set forth in the foregoing are realized. The fixture and the method of positioning the button using the video camera and television screen facilitates and in fact makes possible the accurate assembly of the button and the magnetic slider head in the carriage.

The invention avoids the extremely difficult problem of attempting manually by way of ordinary visual observation to attempt to position the button 42 with the gap of the magnetic slider head referenced in position relative to the carriage itself.

The foregoing disclosure is representative of a preferred form of the invention and is to be interpreted in an illustrative rather than a limiting sense, the invention to be accorded the full scope of the claims appended hereto.

We claim:

1. As an article of manufacture, an apparatus for assembling a carrier member and a magnetic slider head in a carriage which is a component of a magnetic recording apparatus and for orienting the gap of the magnetic slider head in the carrier member relative to the carriage, in combination, fixture means for holding the carriage with the carrying member and the magnetic slider head mounted on the carriage in a position in which the carrier member is relatively movable, means establishing a fixed reference point in a position relative to the gap in the magnetic slider head wherein the relative positions of the fixed reference point and the magnetic slider are observed whereby the carrier member and the magnetic slider head are manually adjusted and positioned relative to the carriage to orient the magnetic gap relative to the reference point such that the magnetic gap is oriented in azimuth, track to track orientation and is indexed relative to the carriage and whereby the carrier member can be bonded to the carriage in the oriented position.

2. An article as in claim 1, including a transparent member which is carried by the fixture in a position wherein the gap is visible through the transparent member in relation to the reference point.

3. An article as in claim 1, wherein the reference point is established in relationship to the gap such that a magnified image of the relationship between the fixed reference point and gap can be produced by a camera and displayed on a display screen in a position to be viewed by an operator who positions the carrier member.

4. An article as in claim 3 wherein the fixed reference point is formed by a reticle in a lens in a camera which is mounted in a predetermined position relative to the fixture.

5. An article as in claim 1, wherein the fixture means includes members for holding the carriage in a predetermined position relative to the fixture means.

6. An article as in claim 5, wherein the holding means includes a pair of rods constructed to receive a carriage in sliding relationship relative to the rods whereby the carriage can be moved to bring the carrier member and magnetic slider head into a predetermined position relative to the fixed reference point.

7. An article as in claim 5, the said fixture having a first end part and second end part, each end part having a pair of notches for holding end parts of said pair of rods and means for retaining the end parts of the rods in the notches.

8. An article as in claim 2, including spring means positioned to engage the said magnetic slider head and to hold it is position against the said transparent member.

9. An article as in claim 8, wherein said spring means is in the form of a cylindrical unit including a spring and a plunger, the bottom of the said fixture having a hole in it positioned to receive the unit and to hold it.

10. A method of assembling in an oriented relationship a carrier member and a magnetic slider head having a magnetic gap in a carriage which is a component of magnetic information storage apparatus, the carriage being constructed to move linearly in the apparatus relative to a record having magnetic tracks, in combination, the steps of positioning the carrier member and magnetic slider head loosely in the carriage, establishing a reference point having a predetermined relationship with reference to the carriage, forming a magnified image of the reference point and the magnetic gap and having an operator manually adjust the orientation of the carrier member and the gap of the magnetic slider head while observing the magnified image so as to orient the magnetic gap relative to the reference point in azimuth, track to track, and indexed relationship.

11. A method as in claim 10, including the step of positioning the carriage in an assembly station and establishing the said reference point with respect to the station.

12. A method as in claim 11, including establishing the reference point at the assembly station so as to have a predetermined relationship to the carrier member and magnetic slider head when the carriage is in the station.

13. A method as in claim 12, including the step of providing the reference point in a camera lens and mounting the camera in a predetermined position at the assembly station.

14. A method as in claim 13, including projecting the magnified image on a display screen in a position to be observed by an operator.

15. A method as in claim 11, including forming a fixture to carry the carriage in a position to be movable linearly on the fixture and positioning the fixture with the carriage in the assembly station.

16. A method of assembling in an oriented relationship a carrier member and a magnetic slider head in a carriage which is a component of magnetic information storage apparatus, the carriage being constructed to move linearly in the apparatus, in combination, the steps of forming a fixture with means to hold the carriage in relatively movable relationship simulating its movement in the said apparatus, positioning the carrier member and magnetic slider head loosely in the carriage while held in the fixture, moving the carriage with the carrier member and magnetic slider head to a predetermined position relative to the fixture, establishing a reference point having a predetermined relationship with reference to the fixture and carriage in position wherein an image can be formed which includes the reference point and the magnetic gap in the magnetic slider head, forming a photographic image of the reference point and the magnetic slider, magnifying the said image, displaying the magnified image on a display screen and having an operator manually adjust the orientation of the carrier member and the magnetic slider head while viewing the image on the screen so as to orient the magnetic gap relative to the reference point in azimuth, track to track relationship and in indexed relationship.

* * * * *